US012425608B2

(12) United States Patent
Kawai et al.

(10) Patent No.: US 12,425,608 B2
(45) Date of Patent: Sep. 23, 2025

(54) INFORMATION PROCESSING DEVICE AND INFORMATION PROCESSING METHOD

(71) Applicant: SONY GROUP CORPORATION, Tokyo (JP)

(72) Inventors: Takuro Kawai, Tokyo (JP); Hisashi Kobiki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 75 days.

(21) Appl. No.: 18/262,627

(22) PCT Filed: Jan. 12, 2022

(86) PCT No.: PCT/JP2022/000672
§ 371 (c)(1),
(2) Date: Jul. 24, 2023

(87) PCT Pub. No.: WO2022/168541
PCT Pub. Date: Aug. 11, 2022

(65) Prior Publication Data
US 2024/0114146 A1   Apr. 4, 2024

(30) Foreign Application Priority Data

Feb. 2, 2021 (JP) ................................ 2021-014692

(51) Int. Cl.
*H04N 19/154* (2014.01)
*G06V 10/25* (2022.01)

(52) U.S. Cl.
CPC .......... *H04N 19/154* (2014.11); *G06V 10/25* (2022.01)

(58) Field of Classification Search
None
See application file for complete search history.

(56) References Cited

U.S. PATENT DOCUMENTS

| 10,313,679 | B2 * | 6/2019 | Kopietz | ................. A63F 13/30 |
| 2015/0117516 | A1 | 4/2015 | Bracha et al. | |
| 2018/0310008 | A1 * | 10/2018 | Kopietz | ............... A63F 13/355 |
| 2021/0166346 | A1 * | 6/2021 | Kim | ...................... H04N 19/132 |
| 2021/0168364 | A1 * | 6/2021 | Ikonin | ................. H04N 19/117 |
| 2021/0195221 | A1 * | 6/2021 | Song | .................... H04N 19/154 |
| 2021/0258598 | A1 * | 8/2021 | Hendry | ............... H04N 19/117 |

(Continued)

FOREIGN PATENT DOCUMENTS

| JP | 08-340531 A | 12/1996 |
| JP | 2009-518103 A | 5/2009 |

(Continued)

OTHER PUBLICATIONS

International Search Report and Written Opinion of PCT Application No. PCT/JP2022/000672, issued on Apr. 5, 2022, 09 pages of ISRWO.

*Primary Examiner* — Jayanti K Patel
*Assistant Examiner* — Christopher Kingsbury Glover
(74) *Attorney, Agent, or Firm* — CHIP LAW GROUP

(57) ABSTRACT

Provided is an information processing device including an optimization processing unit. The optimization processing unit optimizes, on a basis of an evaluation result acquired by evaluation of image quality of when image information for streaming distribution is decoded into a reproducible state on a reception side, a parameter of when the image information is generated.

7 Claims, 10 Drawing Sheets

(56) References Cited

U.S. PATENT DOCUMENTS

| | | | | |
|---|---|---|---|---|
| 2021/0306672 A1* | 9/2021 | Bossen | ................ | H04N 19/117 |
| 2021/0314577 A1* | 10/2021 | Hendry | ................ | H04N 19/172 |
| 2021/0321020 A1* | 10/2021 | Wang | ................ | G06T 7/0004 |
| 2021/0358178 A1* | 11/2021 | Staudigl | ................ | H04N 19/192 |
| 2021/0360260 A1* | 11/2021 | Rehman | ................ | H04N 19/154 |
| 2021/0392381 A1* | 12/2021 | Wang | ................ | H04N 19/117 |
| 2021/0409785 A1* | 12/2021 | Wang | ................ | H04N 19/172 |

FOREIGN PATENT DOCUMENTS

| | | |
|---|---|---|
| JP | 2012-129847 A | 7/2012 |
| JP | 2020-518211 A | 6/2020 |
| WO | 2014/199412 A1 | 12/2014 |

\* cited by examiner

FIG.5

| BIT RATE(mbps) | REGION Ra | REGION Rb | REGION Rc | ... |
|---|---|---|---|---|
| ... | ... | ... | ... | ... |
| 30 | eval_a_30 | eval_b_30 | eval_c_30 | ... |
| 20 | eval_a_20 | eval_b_20 | eval_c_20 | ... |
| ... | ... | ... | ... | ... |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/000672 filed on Jan. 12, 2022, which claims priority benefit of Japanese Patent Application No. JP 2021-014692 filed in the Japan Patent Office on Feb. 2, 2021. Each of the above-referenced applications is hereby incorporated herein by reference in its entirety.

FIELD

The present disclosure relates to an information processing device and an information processing method.

BACKGROUND

Conventionally, with development of an IoT technology and diversification of network environments, various services are provided through a network. In relation to provision of such services, for example, in information processing using cloud computing or the like, a technology for achieving both responsiveness from an operation to an output and quality of output data has also been proposed.

In addition, a service by streaming distribution in which data distribution is performed by utilization of a streaming technology that does not require downloading is also widely spreading in society. As services provided by the streaming distribution, a game streaming service in which a user can casually enjoy a game without depending on capability of hardware on a side of a service user, a video distribution service by subscription or the like, and the like have attracted attention.

CITATION LIST

Patent Literature

Patent Literature 1: WO 2014/199412 A

SUMMARY

Technical Problem

However, in the above-described streaming distribution, there is a case where visibility of an image reproduced on a reception side is impaired due to a technical characteristic of encoding data and performing data distribution.

Thus, the present disclosure proposes an information processing device and an information processing method capable of improving visibility of an image for streaming distribution.

Solution to Problem

To solve the above problem, an electronic device that provides a service that requires an identity verification process according to an embodiment of the present disclosure includes: an information processing device comprising: an optimization processing unit that optimizes, on a basis of an evaluation result acquired by evaluation of image quality of when image information for streaming distribution is decoded into a reproducible state on a reception side, a parameter of when the image information is generated.

BRIEF DESCRIPTION OF DRAWINGS

FIG. 5 is a view illustrating an example of a threshold corresponding to a bit rate according to the first embodiment of the present disclosure.

DESCRIPTION OF EMBODIMENTS

In the following, embodiments of the present disclosure will be described in detail on the basis of the drawings. Note that by assignment of the same number or reference sign to components having substantially the same functional configuration, redundant description thereof may be omitted in the following embodiments. In addition, in the present specification and the drawings, a plurality of components having substantially the same functional configuration may be distinguished and described by assignment of different numbers or reference signs after the same number or reference sign.

In the embodiments of the present disclosure described in the following, examples of application to a game streaming service provided by performance of data distribution by a streaming technology will be described. Note that the embodiments of the present disclosure are not limited to the game streaming service, and can be similarly applied to other services such as a video distribution service using the streaming technology.

Furthermore, the description of the present disclosure will be made according to the following order of items.

1. First embodiment
   1-1. Configuration example of a system
   1-2. Outline of information processing
   1-3. Functional configuration example of an information processing device
   1-4. Processing procedure example of an information processing system
   1-5. Modification example 2. Second embodiment
   2-1. Functional configuration example of an information processing device
   2-2. Processing procedure example of an information processing system
3. Others
4. Hardware configuration example
5. Conclusion

1. First Embodiment

1-1. Configuration Example of a System

Figure 1:
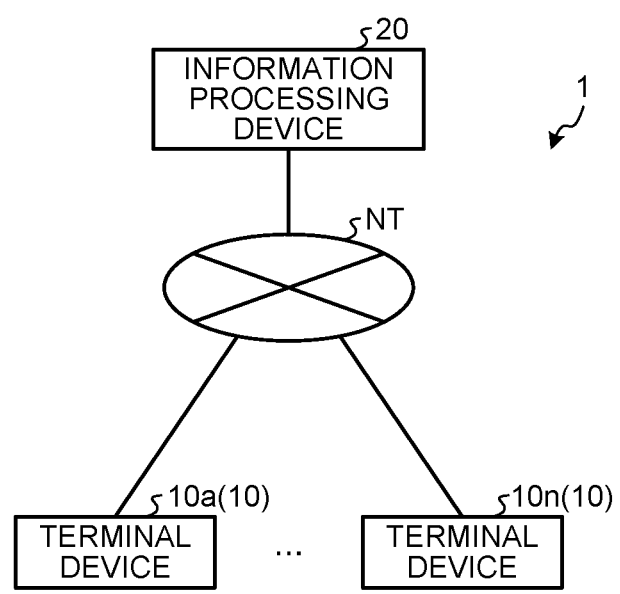
FIG. 1 is a view illustrating a configuration example of a system according to a first embodiment of the present disclosure.

FIG. 1 is a view illustrating a configuration example of a system according to the first embodiment of the present disclosure. As illustrated in FIG. 1, an information processing system 1 according to the first embodiment includes a plurality of terminal devices 10 (10a to 10n) and an information processing device 20. Note that the information processing system 1 may include more information processing devices 20 than the example illustrated in FIG. 1, and may be realized by cloud computing such as a distributed cloud.

The terminal devices 10 and the information processing device 20 are connected to a network NT in a wired or wireless manner. The terminal devices 10 and the information processing device 20 can communicate through the network NT. As the network NT, for example, various networks such as the Internet, a LAN, and a mobile communication network can be applied.

The terminal devices 10 are devices that can play a game by using a game streaming service provided by the information processing device 20. The terminal devices 10 are typically electronic devices such as a smartphone, a tablet, a personal computer, or a home video game console. The terminal devices 10 have a communication function for communicating with the information processing device 20 through the network NT. Furthermore, the terminal devices 10 include various functions for playing a game by using the game streaming service. For example, the various functions include a function for decoding (decoding) a data stream distributed from the information processing device 20 and reproducing the decoded data, a function for automatically giving feedback of operation information during game play to the information processing device 20, and the like.

The information processing device 20 is a device that provides the game streaming service to the terminal devices 10. The information processing device 20 is typically a server device. Details of the information processing device 20 will be described later.

1-2. Outline of Information Processing

Figure 2:
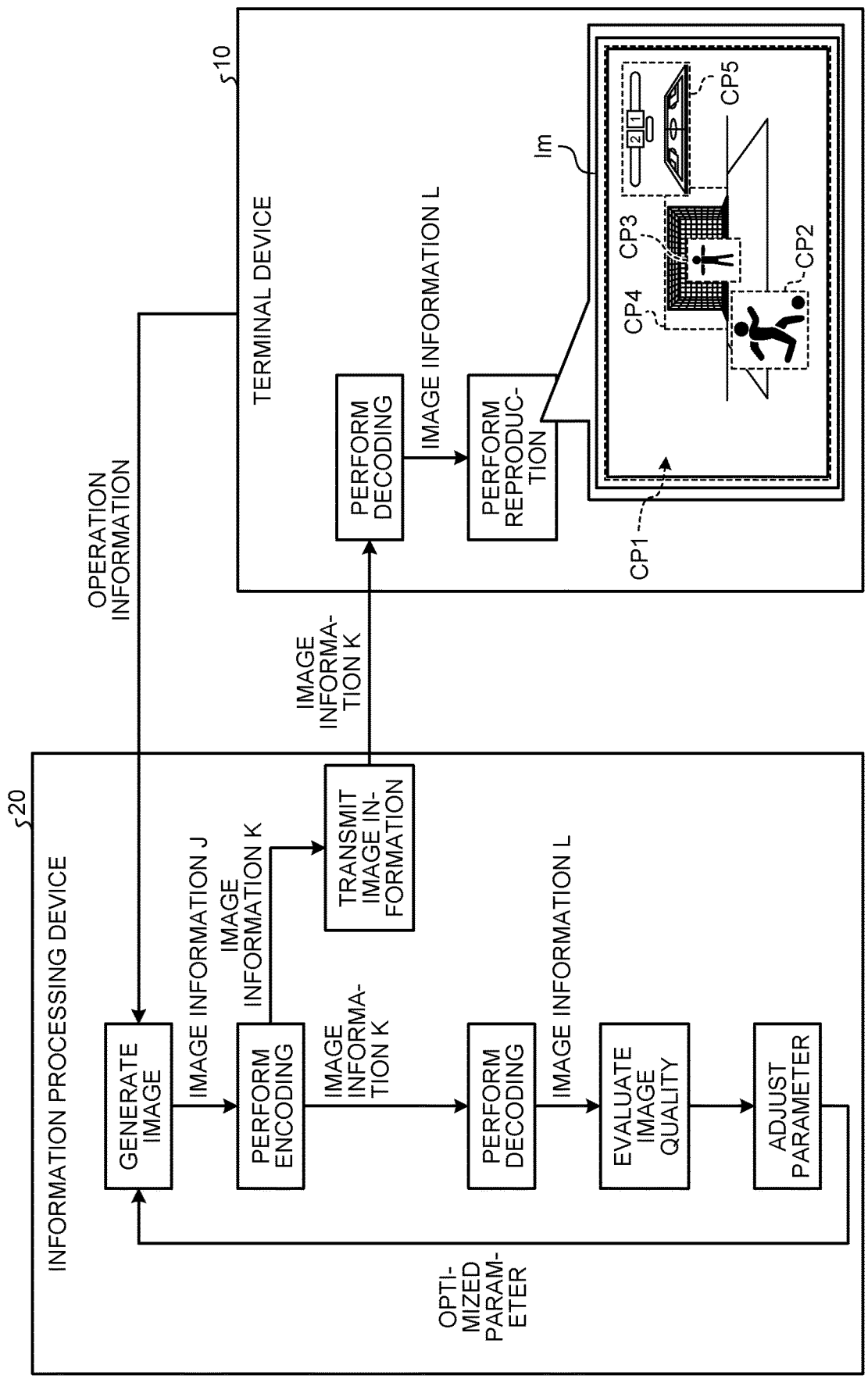
FIG. 2 is a view illustrating an outline of information processing according to the first embodiment of the present disclosure.

FIG. 2 is a view illustrating an outline of information processing according to the first embodiment of the present disclosure. As illustrated in FIG. 2, the information processing device 20 generates image information J of a game image to be distributed to the terminal devices 10 by using operation information and a parameter for image generation acquired from the terminal devices 10. Furthermore, the information processing device 20 encodes the generated image information J, and transmits the encoded image information K to the terminal devices 10.

Each of the terminal devices 10 decodes (decodes) the image information K, which is received from the information processing device 20, to a reproducible state, reproduces the decoded image information L, and outputs an image Im. The image Im output by each of the terminal devices 10 includes a plurality of objects such as a background CP1, characters CP2 to CP3, a structure CP4, and display information (also referred to as a "game UI") CP5. Furthermore, each of the terminal devices 10 feeds back operation information input by a user of the terminal device 10 to the information processing device 20.

While transmitting the image information K to the terminal devices 10, the information processing device 20 decodes (decodes) the image information K, which is transmitted to the terminal devices 10, to a reproducible state similarly to the terminal devices 10, and evaluates image quality of the decoded image information L. For example, the information processing device 20 evaluates the image quality of the image information L for each of specific regions such as the background CP1, the characters CP2 to CP3, the structure CP4, and the display information CP5. Furthermore, the information processing device 20 adjusts a parameter used for generation of the image information of the game image on the basis of an evaluation result of the image quality of the image information L, and gives feedback in such a manner that the parameter can be used for generation of the image information of the next frame.

For example, in the game streaming service, when it is necessary to transmit a game image at a particularly low bit rate, display information (game UI such as a letter and a map) important in progress of a game becomes blur or color noise is generated in the encoded game image, whereby visibility of the game image is impaired and it may become difficult for the user to acquire a comfortable game experience. In order to solve this problem, a method of performing encoding at a necessary bit rate while maintaining the visibility as the game image as much as possible is required. As one of solutions, for example, there is a method of adjusting a parameter of encoding in advance for the game image. However, there is a limit to image quality that can be realized.

On the other hand, in the first embodiment of the present disclosure, the information processing device 20 that is on a side of distributing the image information evaluates image quality of when decoding into a reproducible state is performed by the terminal devices 10 on a reception side of the image information. Then, the information processing device 20 optimizes a parameter, which is for when the image information is generated, on the basis of the evaluation result of the image quality of the image information distributed to the terminal devices 10, and feeds back the optimized parameter to the generation of the image information for streaming distribution. That is, the information processing device 20 can sequentially adjust the parameter for adjusting the image quality of the image information for the streaming distribution in accordance with the image quality of a case where the image information is restored to the reproducible state on the reception side. Thus, for example, in the game streaming service, the information processing device 20 can improve the visibility of the image for the streaming distribution little by little in a time direction.

1-3. Functional Configuration Example of an Information Processing Device

Figure 3:
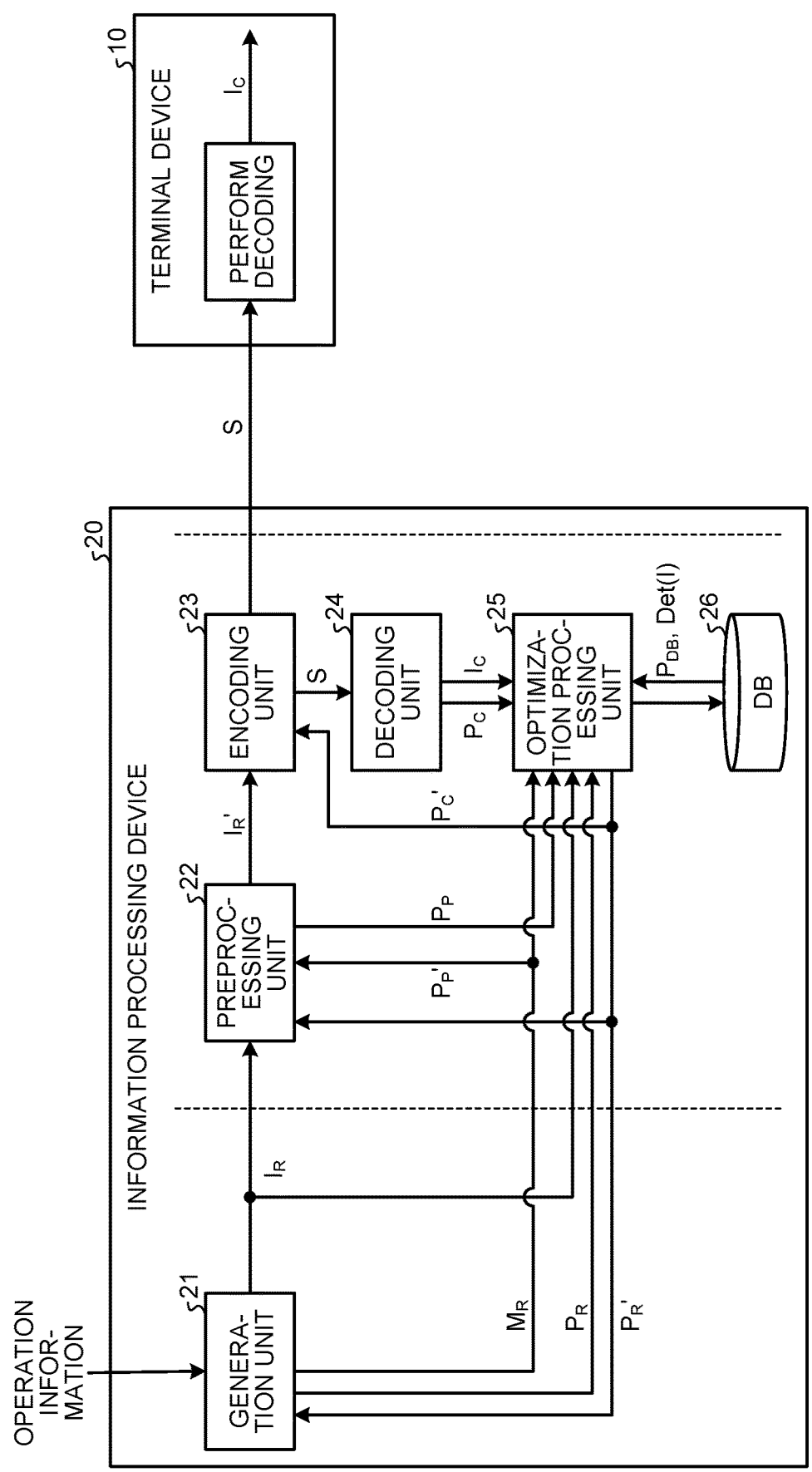
FIG. 3 is a block diagram illustrating a configuration example of an information processing device according to the first embodiment of the present disclosure.

FIG. 3 is a block diagram illustrating a configuration example of the information processing device according to the first embodiment of the present disclosure. As illustrated in FIG. 3, the information processing device 20 includes a generation unit 21, a preprocessing unit 22, an encoding unit 23, a decoding unit 24, an optimization processing unit 25, and a database (DB) 26.

The generation unit 21 generates image information IR of the game image to be distributed to the terminal devices 10 by using the operation information provided from the terminal devices 10, an initial parameter PR for image generation, and the like. Specifically, the generation unit 21 performs shading and texture mapping on the basis of the operation information, the parameter PR, and the like, and generates the game image on which the display information such as the letter and the map (game UI such as the display information CP5 illustrated in FIG. 2) is superimposed. The generation unit 21 transmits the image information IR of the generated game image to the preprocessing unit 22.

Furthermore, the generation unit 21 renders the game image by using an optimized parameter $P_R'$ fed back from the optimization processing unit 25. For example, adjustment is performed to reduce a processing load of the encoding unit 23 in such a manner that a texture that is difficult to be encoded is omitted to some extent.

In addition, the generation unit 21 transmits map information $M_R$, which is information related to rendering of the game image, and the parameter PR to the preprocessing unit 22 and the optimization processing unit 25. The map information $M_R$ includes a Depth Map, an object ID, superimposition information of the display information, and the like.

The preprocessing unit 22 performs preprocessing for improving the visibility of the image information generated by the generation unit 21. Specifically, with the image information $I_R$ and the map information $M_R$ being inputs, the preprocessing unit 22 executes preprocessing by using the optimized parameter $P_P'$ fed back from the optimization processing unit 25 (or the initial parameter $P_P$). As the processing by the preprocessing unit 22, processing of applying a low pass filter (LPF) to a region that is other than the display region extracted from the game image (such as the display information CP5 illustrated in FIG. 2) and is a background region (such as the background CP1 illustrated in FIG. 2) on the basis of the map information $M_R$ and facilitating image compression is exemplified.

Furthermore, the preprocessing unit 22 transmits a processing result (image information) $I_R'$ to the encoding unit 23. In addition, the preprocessing unit 22 transmits an initial parameter $P_P$ to the optimization processing unit 25.

The encoding unit 23 encodes the image information processed by the preprocessing unit 22. Specifically, with the processing result (image information) $I_R'$ of the preprocessing unit 22 being an input, the encoding unit 23 encodes (encodes) the processing result (image information) $I_R'$ of the preprocessing unit 22 by using an optimized parameter $P_C'$ fed back from the optimization processing unit 25 (or initial parameter $P_C$). The encoding unit 23 can use any encoding system such as high efficiency video coding (HEVC) or future video coding (FVC) that is an encoding standard of image information, or a deep learning-based encoding method.

Furthermore, the encoding unit 23 transmits a processing result (data stream S) to the terminal devices 10 via a communication function unit (not illustrated). Furthermore, the encoding unit 23 sends the processing result (data stream S) and the initial parameter $P_C$ to the decoding unit 24.

With the processing result (data stream S) of the encoding unit 23 being an input, the decoding unit 24 decodes (decodes) the processing result (data stream S) by a method similar to those of the terminal devices 10. The decoding unit 24 sends the decoded image information $I_C$ and the initial parameter $P_C$ acquired from the encoding unit 23 to the optimization processing unit 25.

The optimization processing unit 25 optimizes the parameter, which is of when the image information is generated, on the basis of the evaluation result acquired by evaluating the image quality of when the image information for the streaming distribution is decoded into the reproducible state on the reception side. Specifically, with the image information $I_R$, the image information $I_C$, the map information $M_R$, and the initial parameters $P_R$, $P_P$, and $P_C$ being inputs, the optimization processing unit 25 stores the optimized parameters $P_R'$, $P_P'$, and $P_C'$ (hereinafter, collectively referred to as a "parameter P'") in the database (DB) 26 as the parameter set $P_{DB}$.

The database (DB) 26 stores the parameter set $P_{DB}$ including the parameter P', a function Det (I) for feature amount/region detection processing, a threshold for image quality evaluation according to a bit rate, and the like. The database (DB) 26 can hold, as the parameter sets $P_{DB}$, a plurality of parameter sets expressing a degree of an image quality improvement effect. The optimization processing unit 25 can adjust the image quality by appropriately switching and using these parameter sets. An example of a setting related to a noise controlling effect will be described as a parameter set expressing the degree of the image quality improvement effect. For example, it is conceivable to prioritize controlling of noise over expression of details of the image in a case where the noise controlling effect "strong" is set, and it is conceivable to prioritize the expression of the details of the image over the controlling of the noise in a case where the noise controlling effect "weak" is set. By preparing several settings for such image quality adjustment (provided as a control model using a parameter, mathematical expression, and the like), it is possible to effectively execute image quality adjustment at the time of the optimization processing.

Parameter Optimization Algorithm

Figure 4:
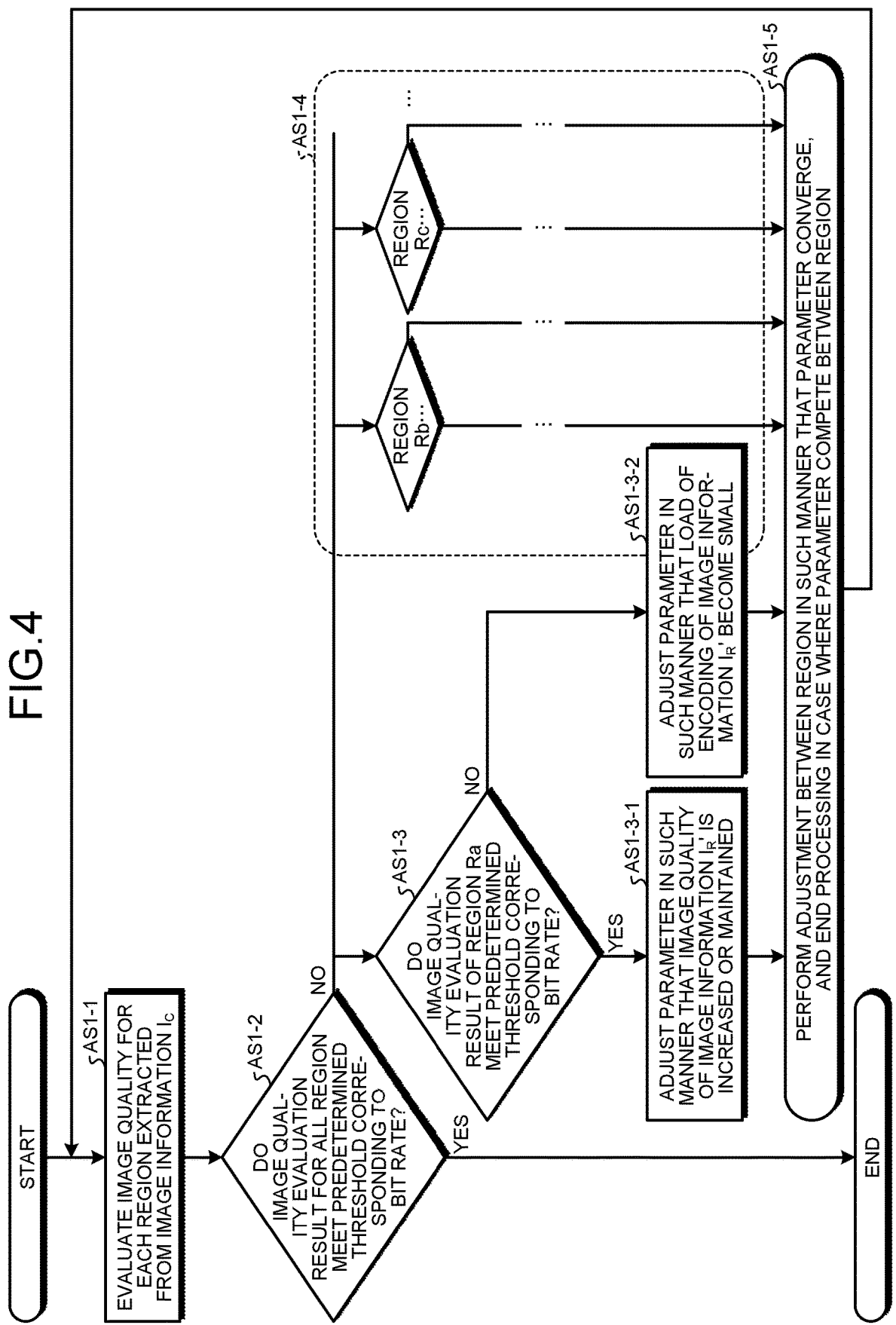
FIG. 4 is a view illustrating an outline of a parameter optimization algorithm according to the first embodiment of the present disclosure.

Hereinafter, a parameter optimization algorithm executed by the optimization processing unit 25 according to the first embodiment will be described. FIG. 4 is a view illustrating an outline of the parameter optimization algorithm according to the first embodiment of the present disclosure. The optimization algorithm illustrated in FIG. 4 is executed, for example, in units of frames of the image information $I_C$. Furthermore, the optimization algorithm illustrated in FIG. 4 may be executed in every frame, or may be executed at an arbitrary timing such as once in a several frames.

As illustrated in FIG. 4, the optimization processing unit 25 evaluates the image quality for each region extracted from the image information $I_C$ on the basis of the map information $M_R$ and the function Det (I) for the feature amount/region detection processing (Procedure AS1-1). The image quality is evaluated by utilization of any image quality evaluation method such as a peak signal to noise ratio (PSNR) or structural similarity (SSIM), various loss functions, or the like.

Subsequently, for all the regions extracted from the image information $I_C$, the optimization processing unit 25 determines whether the image quality evaluation result meets a predetermined threshold corresponding to the bit rate (Procedure AS1-2). FIG. 5 is a view illustrating an example of the threshold corresponding to the bit rate according to the first embodiment of the present disclosure. As illustrated in FIG. 5, the database (DB) 26 included in the information processing device 20 stores a threshold for image quality evaluation corresponding to each region for each bit rate of when the image information is transmitted. The optimization processing unit 25 refers to the database (DB) 26 and determines whether the evaluation result of each region meets the corresponding threshold.

In a case where the optimization processing unit 25 determines that the evaluation result of the image quality meets the predetermined threshold corresponding to the bit rate for all the regions (Procedure AS1-2; Yes), the optimization algorithm is ended.

On the other hand, in a case where the optimization processing unit 25 determines that the evaluation result of the image quality does not meet the predetermined threshold corresponding to the bit rate for all the regions (Procedure AS1-2; No), it is determined whether the image quality evaluation result of the region Ra meets the predetermined threshold corresponding to the bit rate (Procedure AS1-3). That is, the optimization processing unit 25 individually evaluates the image quality for each region and adjusts a parameter used for processing of each of blocks (the generation unit 21, the preprocessing unit 22, and the encoding unit 23).

In a case where the optimization processing unit 25 determines that the image quality evaluation result of the region Ra meets the predetermined threshold corresponding to the bit rate (Procedure AS1-3; Yes), the parameter is adjusted in such a manner as to increase the image quality of the image information $I_R'$ that is the processing result of the preprocessing unit 22, or to maintain the image quality (Procedure AS1-3-1). In a case of increasing the image quality of the image information $I_R'$, the optimization processing unit 25 increases the image quality of the image information $I_R'$ by adjusting the rendering in the generation unit 21 and the processing in the preprocessing unit 22. For example, the optimization processing unit 25 can adjust the image quality of the image information $I_R'$ by appropriately switching and using the plurality of the parameter sets $P_{DB}$ held in the database (DB) 26 according to the image quality adjustment method.

On the other hand, in a case where the optimization processing unit 25 determines that the evaluation result of the image quality of the region Ra does not meet the predetermined threshold corresponding to the bit rate (Procedure AS1-3; No), the parameter is adjusted in such a manner that a load of the encoding of the image information $I_R'$ becomes small (Procedure AS1-3-2). For example, the optimization processing unit 25 adjusts the rendering in the generation unit 21 and the processing in the preprocessing unit 22 and decrease the image quality of the image information $I_R'$.

Furthermore, the optimization processing unit 25 individually evaluates the image quality of the other region Rb, region Rc, and the like, and adjusts the parameters, similarly to the region Ra described above (Procedure AS1-4).

When the individual evaluation of the image quality and the adjustment of the parameters are completed for all the regions, in a case where the parameters compete between the regions, the optimization processing unit 25 performs adjustment between the regions in such a manner that the parameters converge, and ends the adjustment of the parameters (Procedure AS1-5). For example, the optimization processing unit 25 adjusts the parameters between the regions in such a manner as to prioritize a region where the image quality evaluation result is deviated the most from the predetermined threshold. After the parameter adjustment is ended, the optimization processing unit 25 returns to the above-described procedure AS1-1 and continues the optimization algorithm for the next frame. As described above, the information processing device 20 can improve the image quality in the time direction and improve the visibility by adjusting the parameters.

Note that the optimization processing unit 25 can arbitrarily set the number of repetitions of the procedures AS1-1 to AS1-5 included in the optimization algorithm. For example, the optimization processing unit 25 may repeatedly execute the optimization algorithm for the previously-set number of times, and select an optimal parameter adjustment method from among the optimization results.

The optimization processing unit 25 can optimize the parameters used for the processing of each of the blocks (the generation unit 21, the preprocessing unit 22, and the encoding unit 23) on the basis of the evaluation result of the image quality by executing the above-described optimization algorithm. Note that the optimization processing unit 25 is not specifically limited to a case of optimizing the parameters used for the processing of each of the blocks of the generation unit 21, the preprocessing unit 22, and the encoding unit 23. For example, the optimization processing unit 25 may optimize at least one of the parameter used for the processing of the generation unit 21 or the parameter used for processing of the preprocessing unit 22.

Note that the optimization processing unit 25 may collectively execute the processing from the procedure AS1-1 to the procedure AS1-5 described above by the deep learning-based processing. For example, the optimization processing unit 25 can use a parameter estimation technology such as differentiable rendering.

1-4. Processing Procedure Example of an Information Processing System

Figure 6:
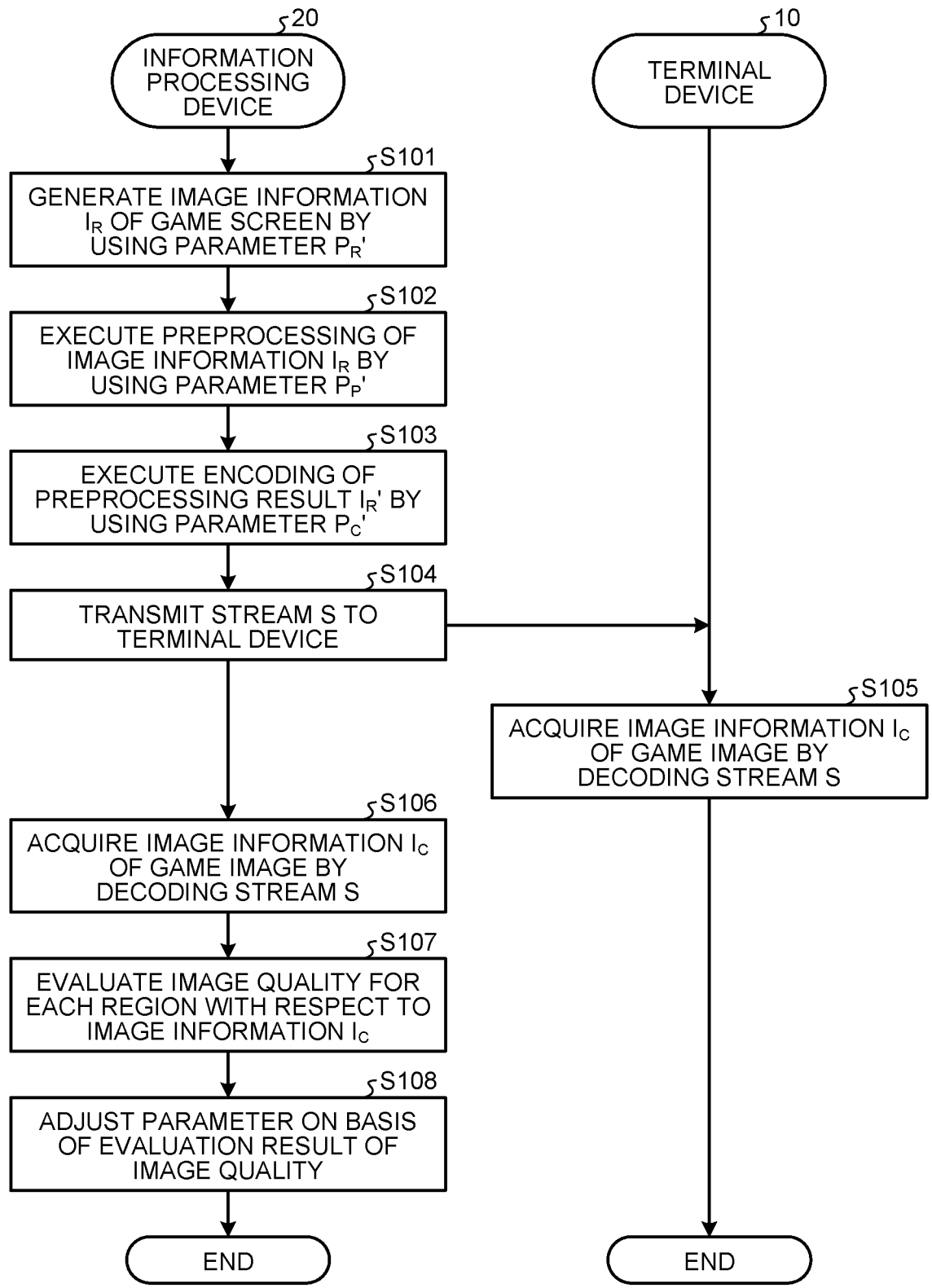
FIG. 6 is a view illustrating an example of a processing procedure of an information processing system according to the first embodiment of the present disclosure.

FIG. 6 is a view illustrating an example of a processing procedure of the information processing system according to the first embodiment of the present disclosure. FIG. 6 is a view illustrating a processing procedure for one frame of the game image for the streaming distribution.

As illustrated in FIG. 6, the generation unit 21 of the information processing device 20 generates the image information IR of the game image by using the optimized parameter $P_R'$ (Step S101).

Furthermore, the preprocessing unit 22 of the information processing device 20 executes the preprocessing of the image information $I_R$ by using the optimized parameter $P_P'$ (Step S102).

Furthermore, the encoding unit 23 of the information processing device 20 uses the optimized parameter $P_C'$ and executes the encoding (encoding) of the preprocessing result $I_R'$ that is the processing result of the preprocessing unit 22 (Step S103).

Furthermore, the encoding unit 23 transmits the data stream S, which is the processing result, to the terminal devices 10 (Step S104).

On the other hand, each of the terminal devices 10 decodes the data stream S received from the information processing device 20, outputs the image information $I_C$ of the game image (Step S105), and ends the processing procedure illustrated in FIG. 6.

Furthermore, the decoding unit 24 of the information processing device 20 decodes (decodes) the data stream S transmitted to the terminal devices 10, and acquires the image information $I_C$ of the game image (Step S106).

Furthermore, the optimization processing unit 25 of the information processing device 20 evaluates the image quality of the image information Ic for each region (Step S107).

Furthermore, the optimization processing unit 25 of the information processing device 20 adjusts the parameters used for the processing of each of the blocks (the generation unit 21, the preprocessing unit 22, and the encoding unit 23) on the basis of the evaluation result of the image quality in Step S107 (Step S108), and ends the processing procedure illustrated in FIG. 6.

1-5. Modification Example

Figure 7:
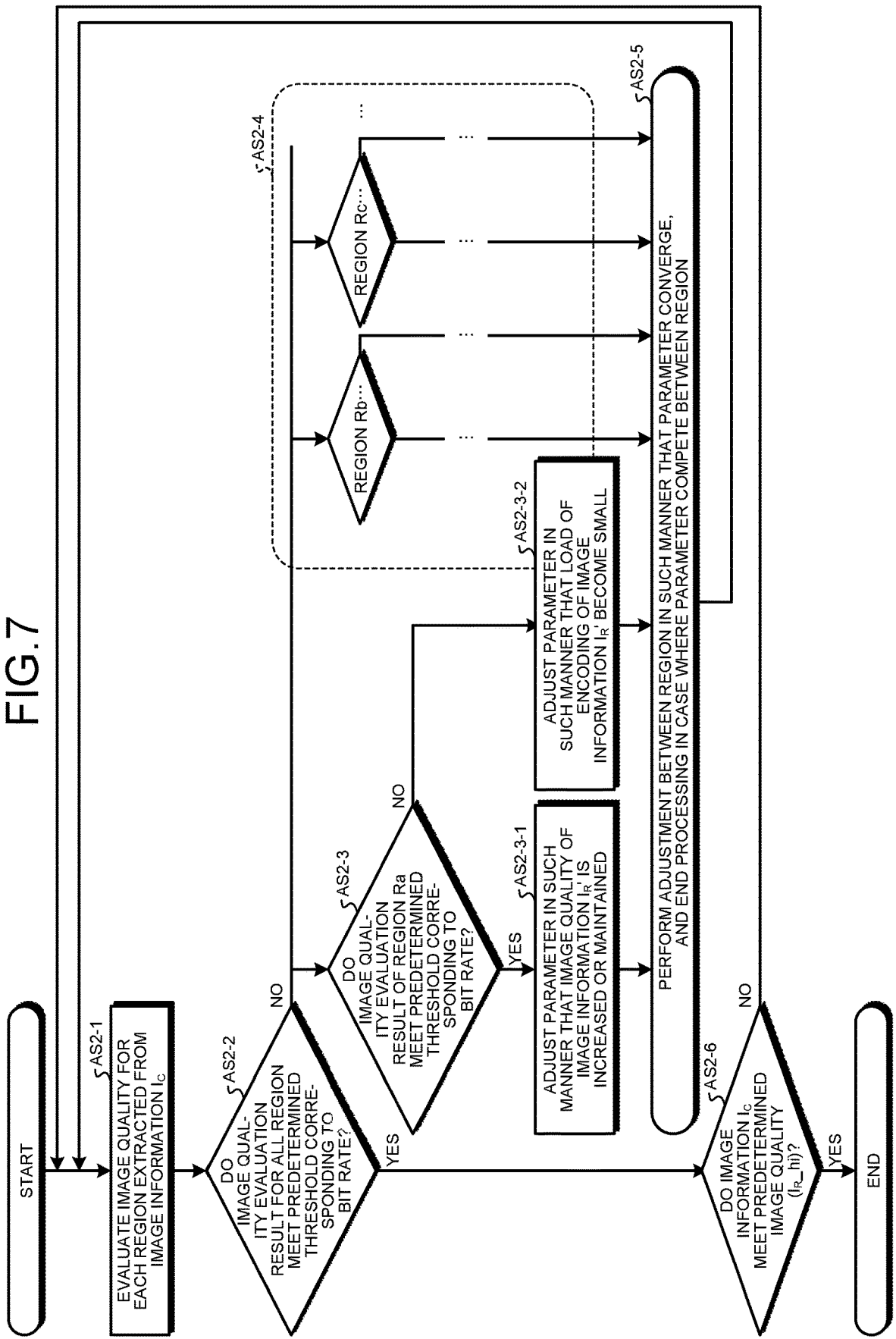
FIG. 7 is a view illustrating an outline of a parameter optimization algorithm according to a modification example of the present disclosure.

Hereinafter, a modification example of an optimization algorithm executed by an optimization processing unit 25 of an information processing device 20 will be described. FIG. 7 is a view illustrating an outline of a parameter optimization algorithm according to the modification example of the present disclosure.

The optimization algorithm according to the modification example is different from the optimization algorithm according to the first embodiment (see FIG. 4) in a point that a procedure of determining whether quality of image information transmitted to the terminal devices 10 is equal to or higher than a certain level is included. That is, the optimization algorithm according to the modification example newly includes a procedure AS2-6 that is not included in the optimization algorithm according to the first embodiment. Note that since the procedures AS2-1 to AS2-5 illustrated in FIG. 7 are the same as the procedures AS1-1 to AS1-5 illustrated in FIG. 4 described above, detailed description thereof will be appropriately omitted.

As illustrated in FIG. 7, in a case where the optimization processing unit 25 determines that an evaluation result of the image quality meets a predetermined threshold (example of a first threshold) corresponding to a bit rate for all regions extracted from image information $I_C$ acquired by decoding a data stream S (AS2-2; Yes), it is determined whether the image information $I_C$ meets predetermined image quality ($I_R\_hi$) (AS2-6). For example, the optimization processing unit 25 holds the image information $I_R\_hi$ created with high quality in a database (DB) 26. Then, the optimization processing unit 25 determines whether the quality of the image information IC meets a threshold (example of a second threshold) indicating the image quality of the image information $I_R\_hi$. As a result, the processing can be controlled in such a manner that only the image information that meets a certain quality level is transmitted to the terminal devices 10.

In a case where the optimization processing unit 25 determines that the image information $I_C$ meets the predetermined image quality ($I_R\_hi$) (AS2-6; Yes), the optimization algorithm illustrated in FIG. 7 is ended.

On the other hand, in a case where the optimization processing unit 25 determines that the image information $I_C$ does not meet the predetermined image quality ($I_R\_hi$) (ASA 2-6; No), the procedure returns to the procedure AS2-1, and the optimization algorithm illustrated in FIG. 7 is continued for the next frame.

Second Embodiment

2-1. Functional Configuration Example of an Information Processing Device

Figure 8:
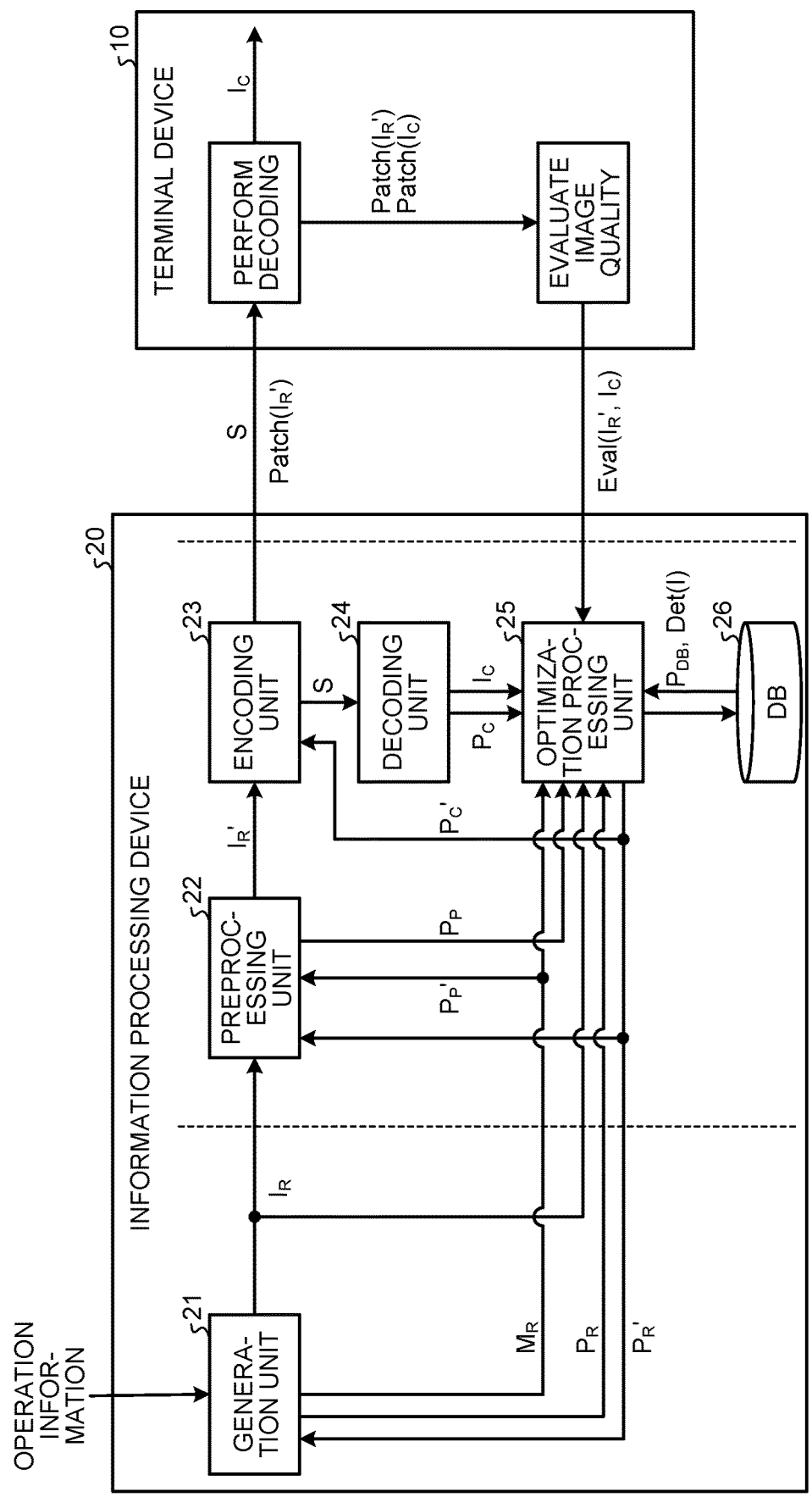
FIG. 8 is a block diagram illustrating a configuration example of an information processing device according to a second embodiment of the present disclosure.

In the following, the second embodiment of the present disclosure will be described. FIG. 8 is a block diagram illustrating a configuration example of an information processing device according to the second embodiment of the present disclosure. An information processing device 20 according to the second embodiment basically has a configuration similar to that of the information processing device 20 according to the first embodiment. However, processing functions of an encoding unit 23 and an optimization processing unit 25 are partially different.

The encoding unit 23 executes processing of cutting out a processing result (image information) $I_R'$ of a preprocessing unit 22 into patches, and acquires patch information Patch ($I_R'$). A patch size may be any size such as 64×64 pixels smaller than the processing result (image information) $I_R'$ or 256×256 pixels. Then, the encoding unit 23 transmits the patch information Patch ($I_R'$) to terminal devices 10. The encoding unit 23 may transmit the acquired patch information Patch ($I_R'$) together with a data stream S that is a processing result acquired by encoding of the processing result (image information) $I_R'$ of the preprocessing unit 22, or may perform transmission at any timing different from that of the data stream S. In a case where the patch information patch ($I_R'$) is transmitted to the terminal devices 10 together with the data stream S, the encoding unit 23 can place the patch information Patch ($I_R'$) by using a region of supplemental enhancement information (SEI) in the data stream S.

Here, operation of the terminal devices 10 which are on a reception side of the data stream S will be described. When decoding the data stream S and outputting the image information $I_C$, each of the terminal devices 10 cuts out the decoded image information Ic into patches in accordance with a size of the patch information Patch ($I_R'$) enclosed in the data stream S, and acquires the patch information patch ($I_C$). In addition, with the patch information Patch ($I_R'$) and the patch information Patch ($I_C$) as inputs, each of the terminal devices 10 acquires an evaluation result Eval ($I_R'$, $I_C$) acquired by evaluation of a difference in image quality between the patch information Patch ($I_R'$) and the patch information patch ($I_C$). The image quality can be evaluated by utilization of any image quality evaluation method such as PSNR or SSIM, various loss functions, or the like. Each of the terminal devices 10 transmits the image quality evaluation result Eval ($I_R'$, $I_C$) to the information processing device 20.

The description returns to the information processing device 20. The optimization processing unit 25 aggregates the evaluation results Eval ($I_R'$, $I_C$) of the image quality acquired from the plurality of terminal devices 10, and takes into consideration when evaluating the image quality of the image information $I_C$. By aggregating the evaluation results of the image quality in the plurality of terminal devices 10, the information processing device 20 can objectively determine the image quality of the actual game image on the reception side, and can improve adjustment accuracy of the parameter.

2-2. Processing Procedure Example of an Information Processing System

Figure 9:
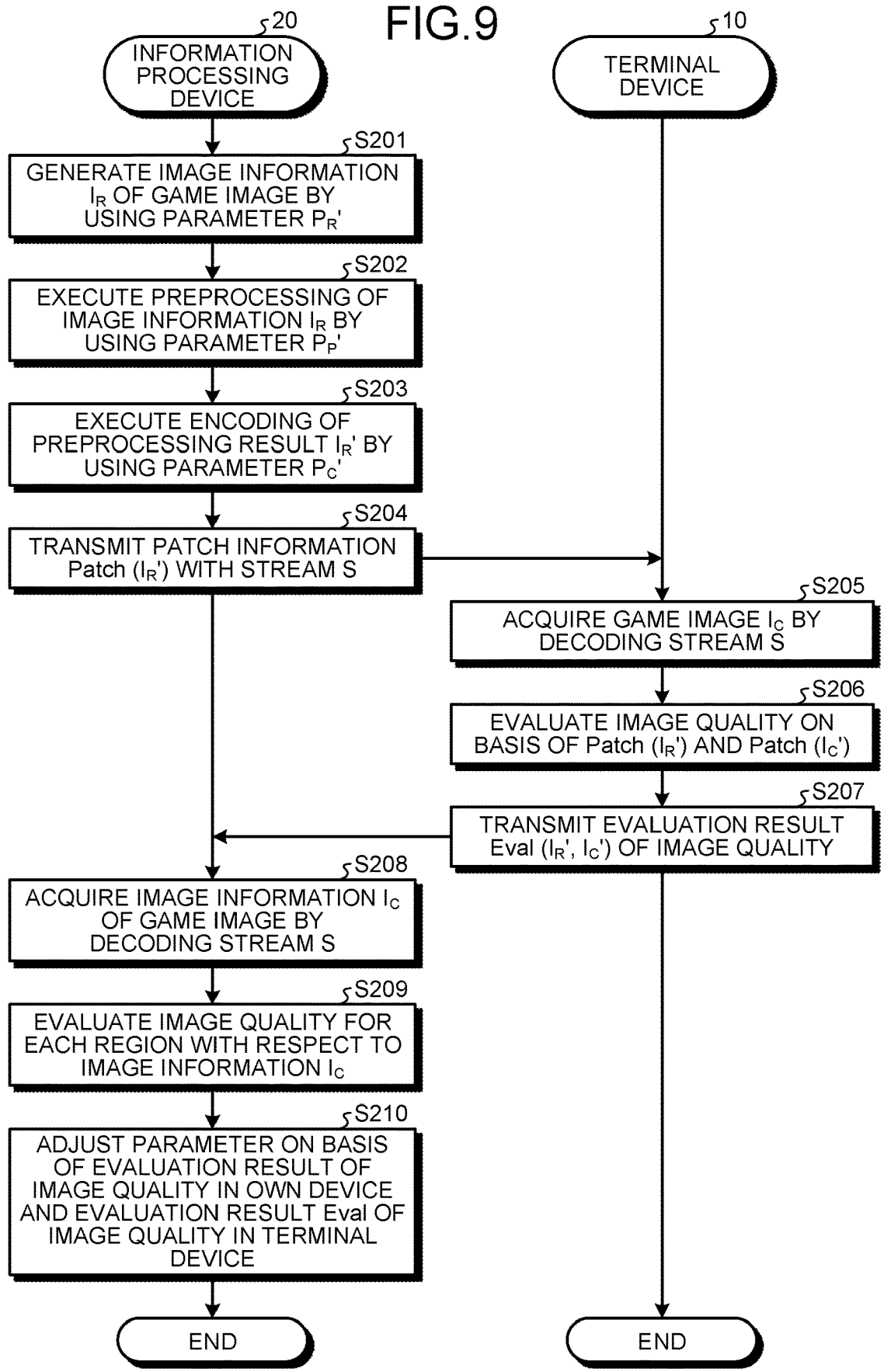
FIG. 9 is a view illustrating an example of a processing procedure of an information processing system according to the second embodiment of the present disclosure.

FIG. 9 is a view illustrating an example of a processing procedure of an information processing system according to the second embodiment of the present disclosure. The information processing system 1 according to the second embodiment is different from the processing procedure according to the first embodiment in a point that the information processing device 20 aggregates evaluation results of image quality of a game image from the terminal devices 10 and takes the aggregated evaluation results into consideration for the adjustment of the parameter. Note that FIG. 9 is a view illustrating a processing procedure for one frame of a game image for streaming distribution.

As illustrated in FIG. 9, the generation unit 21 of the information processing device 20 generates image information $I_R$ of the game image by using an optimized parameter $P_R'$ (Step S201).

Furthermore, the preprocessing unit 22 of the information processing device 20 executes preprocessing of the image information $I_R$ by using the optimized parameter $P_P'$ (Step S202).

Furthermore, the encoding unit 23 of the information processing device 20 uses the optimized parameter $P_C'$ and executes encoding (encoding) of a preprocessing result $I_R'$ that is a processing result of the preprocessing unit 22 (Step S203).

Furthermore, the encoding unit 23 transmits the patch information patch ($I_R'$) cut out from the data stream S to the terminal devices 10 together with the data stream S that is a processing result (Step S204).

On the other hand, each of the terminal devices 10 decodes the data stream S received from the information processing device 20 and acquires the image information $I_C$ of the game image (Step S205). In addition, each of the terminal devices 10 evaluates the image quality on the basis of the patch information Patch ($I_R'$) enclosed in the data stream S and patch information patch ($I_C'$) cut out from the image information $I_C$ (Step S206). Furthermore, each of the terminal devices 10 transmits the image quality evaluation result Eval ($I_R'$, $I_C$) to the information processing device 20 (Step S207), and ends the processing procedure illustrated in FIG. 9.

Furthermore, a decoding unit 24 of the information processing device 20 decodes (decodes) the data stream S transmitted to the terminal devices 10, and acquires the image information $I_C$ of the game image (Step S208).

Furthermore, the optimization processing unit 25 of the information processing device 20 evaluates the image quality of the image information Ic for each region (Step S209).

Furthermore, the optimization processing unit 25 of the information processing device 20 adjusts parameters used for processing of each of the blocks (the generation unit 21, the preprocessing unit 22, and the encoding unit 23) on the basis of an image quality evaluation result in Step S107 and the image quality evaluation result Eval received from the terminal devices 10 (Step S210), and ends the processing procedure illustrated in FIG. 9.

3. Others

Various programs for realizing the information processing method executed by the information processing device 20 according to each of the embodiments and the modification example of the present disclosure may be stored and distributed in a computer-readable recording medium such as an optical disk, a semiconductor memory, a magnetic tape, or a flexible disk. At this time, the information processing device 20 according to each of the embodiments and the modification example of the present disclosure can realize the information processing method according to each of the embodiments and the modification example of the present disclosure by installing the various programs on a computer and executing the programs.

In addition, the various programs for realizing the information processing method executed by the information processing device 20 according to each of the embodiments and the modification example of the present disclosure may be stored in a disk device included in a server on a network such as the Internet and may be downloaded to the computer, for example. Furthermore, functions provided by the various programs for realizing the information processing method executed by the information processing device 20 according to each of the embodiments and the modification example of the present disclosure may be realized by cooperation of an OS and an application program. In this case, a portion other than the OS may be stored in a medium and distributed, or the portion other than the OS may be stored in an application server and downloaded to the computer, for example.

Furthermore, at least a part of the processing function for realizing the information processing method executed by the information processing device 20 according to each of the embodiments and the modification example of the present disclosure may be realized by a cloud server on a network. For example, at least a part of the processing according to the first embodiment or the modification example of the first embodiment (see, for example, FIG. 4, FIG. 6, and FIG. 7), or at least a part of the processing according to the second embodiment (see, for example, FIG. 9) may be executed on the cloud server.

Also, among the pieces of the processing described in each of the embodiments and the modification example of the present disclosure, a whole or part of the processing described to be automatically performed can be manually performed, or a whole or part of the processing described to be manually performed can be automatically performed by a known method. In addition, the processing procedures, specific names, and information including various kinds of data or parameters described in the above document or in the drawings can be arbitrarily changed unless otherwise specified. For example, various kinds of information illustrated in each of the drawings are not limited to the illustrated information.

Furthermore, each component of the information processing device 20 according to each of the embodiments and the modification example of the present disclosure is functionally conceptual, and is not necessarily configured in a manner illustrated in the drawings. For example, the information processing device 20 may be physically distributed to a device that distributes image information and a device that executes optimization of a parameter. Furthermore, for example, the processing function of the optimization processing unit 25 of the information processing device 20 may be functionally distributed to a functional unit that executes processing of evaluating image quality and a functional unit that executes processing of optimizing a parameter.

Also, the embodiments and modification examples of the present disclosure can be arbitrarily combined in a range in which processing contents do not contradict with each other. Furthermore, the order of steps illustrated in the flowcharts according to the embodiments of the present disclosure can be changed as appropriate.

Although the embodiments and the modification example of the present disclosure have been described above, the technical scope of the present disclosure is not limited to the above-described embodiments and modification example, and various changes can be made without departing from the gist of the present disclosure. In addition, components of different embodiments and modification examples may be arbitrarily combined.

4. Hardware Configuration Example

Figure 10:
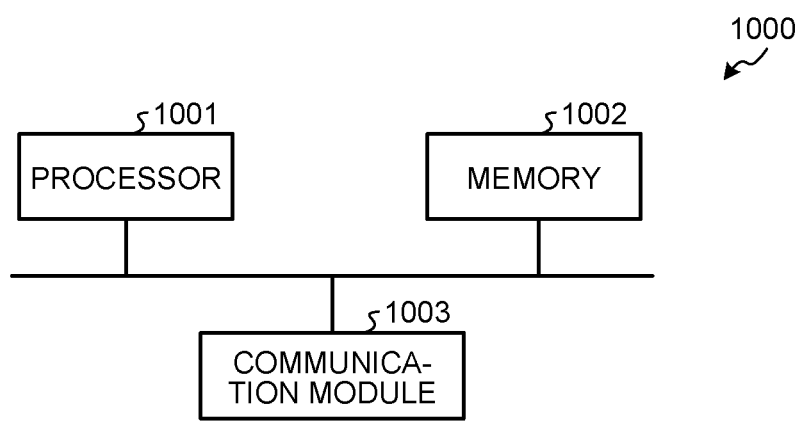
FIG. 10 is a block diagram illustrating a hardware configuration example of a computer corresponding to an information processing device according to each embodiment and a modification example of the present disclosure.

A hardware configuration example of a computer corresponding to the information processing device 20 according to each of the embodiments and the modification example of the present disclosure will be described with reference to FIG. 10. FIG. 10 is a block diagram illustrating the hardware configuration example of the computer corresponding to the information processing device according to each of the embodiments and the modification example of the present disclosure. Note that an example of the hardware configuration of the computer corresponding to the information processing device 20 is illustrated in FIG. 10, and the configuration is not necessarily limited to that illustrated in FIG. 10.

As illustrated in FIG. 10, a computer 1000 corresponding to the information processing device 20 according to each of the embodiments and the modification example of the present disclosure includes a processor 1001, a memory 1002, and a communication module 1003.

The processor 1001 is typically a central processing unit (CPU), a digital signal processor (DSP), a system-on-a-chip (SoC), system large scale integration (LSI), or the like.

The memory 1002 is typically a nonvolatile or volatile semiconductor memory such as a random access memory (RAM), a read only memory (ROM), or a flash memory, or a magnetic disk. The database (DB) 26 included in the information processing device 20 is realized by the memory 1002.

The communication module 1003 is typically a communication card for a wired or wireless local area network (LAN), long term evolution (LTE), Bluetooth (registered trademark), or a wireless USB (WUSB), a router for optical communication, various communication modems, or the like. The information processing device 20 can realize communication with the terminal devices 10 by the communication module 1003.

The processor 1001 functions as, for example, an arithmetic processing unit or a control device, and controls overall operation of each component or a part thereof on the basis of various programs recorded in the memory 1002 (information processing program for realizing the information processing method executed by the information processing device 20). Each of the functional units (the generation unit 21, the preprocessing unit 22, the encoding unit 23, the decoding unit 24, and the optimization processing unit 25) included in the information processing device 20 is realized when the processor 1001 reads an information processing program, in which a command for operating as each of the functional units is described, from the memory 1002 and executes the information processing program.

That is, the processor 1001 and the memory 1002 realize information processing by each of the functional units included in the information processing device 20 in cooperation with software (information processing program stored in the memory 1002).

5. Conclusion

The information processing device 20 according to the embodiments and the modification example of the present disclosure includes the optimization processing unit 25 that optimizes the parameter at the time of generation of the image information on the basis of the evaluation result acquired by evaluation of the image quality of when the image information for the streaming distribution is decoded into the reproducible state on the reception side. As a result, the visibility of the image for the streaming distribution can be improved.

Furthermore, the information processing device 20 further includes the generation unit 21 that generates the image information. The optimization processing unit 25 optimizes the parameter, which is used when the generation unit 21 generates the image information, on the basis of the evaluation result of the image quality. As a result, the method of generating the image information, such as rendering can be sequentially adjusted, and the visibility of the image can be improved in the time direction.

Furthermore, the information processing device 20 further includes the preprocessing unit 22 that performs processing for improving the visibility of the image information generated by the generation unit 21. The optimization processing unit 25 optimizes the parameter, which is used when the preprocessing unit 22 performs processing, on the basis of the evaluation result of the image quality. As a result, the method of preprocessing can be sequentially adjusted, and the visibility of the image can be improved in the time direction.

Furthermore, the information processing device 20 further includes the encoding unit 23 that encodes the image information processed by the preprocessing unit 22. On the basis of the evaluation result of the image quality, the optimization processing unit 25 optimizes the parameter used when the encoding unit 23 encodes the image information. As a result, the encoding (encoding) method can be sequentially adjusted, and the visibility of the image can be improved in the time direction.

In addition, the optimization processing unit 25 evaluates the image quality for each region extracted from the image information. As a result, flexible image quality adjustment according to a configuration of the image can be realized.

Furthermore, the optimization processing unit 25 optimizes the parameters on the basis of whether the evaluation result of the image quality for each region satisfies a threshold set in advance for each region according to a bit rate necessary for when the image information is distributed. As a result, it is possible to realize appropriate image quality adjustment according to the bit rate of when the image information is distributed.

Furthermore, in a case where adjustment values of the parameters compete between the regions, the optimization processing unit 25 optimizes the parameters by prioritizing a region in which the evaluation result of the image quality is deviated the most from the threshold. As a result, the processing can be executed in such a manner as to improve the visibility of the image to no small extent.

Furthermore, the optimization processing unit 25 optimizes the parameters on the basis of whether the evaluation result of the image quality for each region satisfies a first threshold set in advance for each region according to the bit rate, which is necessary when the image information is distributed, and a second threshold for evaluating whether the image quality of the image information is equal to or higher than a predetermined level. As a result, the processing can be controlled in such a manner that only the image information that meets a certain quality level is transmitted to the terminal devices 10.

Furthermore, the optimization processing unit 25 acquires the evaluation result of the image quality on the reception side of the image information, and optimizes the parameters in consideration of the acquired evaluation result of the image quality. As a result, the image quality of the actual game image on the reception side can be objectively determined, and the parameter adjustment accuracy can be improved.

Furthermore, the image information is the game image for the streaming distribution. This makes it possible to improve the visibility of the game image in the game streaming service.

Note that the effects described in the present specification are merely illustrative or exemplary, and are not restrictive. That is, in addition to the above effects or instead of the above effects, the technology of the present disclosure can exhibit a different effect obvious to those skilled in the art from the description of the present specification.

Note that the technology of the present disclosure can also have the following configurations as what belongs to the technical scope of the present disclosure.

(1)
An information processing device comprising:
an optimization processing unit that optimizes, on a basis of an evaluation result acquired by evaluation of image quality of when image information for streaming distribution is decoded into a reproducible state on a reception side, a parameter of when the image information is generated.

(2)
The information processing device according to (1), further comprising a generation unit that generates the image information, wherein
the optimization processing unit
optimizes a parameter, which is used when the generation unit generates the image information, on a basis of the evaluation result of the image quality.

(3)
The information processing device according to (1) or (2), further comprising a preprocessing unit that performs processing for improving visibility of the image information generated by the generation unit, wherein
the optimization processing unit
optimizes a parameter, which is used when the preprocessing unit performs processing, on the basis of an evaluation result of the image quality.

(4)
The information processing device according to (2) or (3), further comprising an encoding unit that encodes the image information processed by the preprocessing unit, wherein
the optimization processing unit
optimizes a parameter, which is used when the encoding unit encodes the image information, on a basis of an evaluation result of the image quality.

(5)
The information processing device according to any one of (1) to (4), wherein
the optimization processing unit
evaluates the image quality for each of regions extracted from the image information.

(6)
The information processing device according to (5), wherein
the optimization processing unit
optimizes the parameter on a basis of whether an evaluation result of the image quality for each of the regions satisfies a threshold set in advance for each of the regions according to a bit rate necessary when the image information is distributed.

(7)
The information processing device according to (6), wherein
the optimization processing unit
optimizes the parameter with a priority on the region in which the evaluation result of the image quality is deviated the most from the threshold in a case where adjustment values of the parameter compete between the regions.

(8)
The information processing device according to any one of (5) to (7), wherein
the optimization processing unit
optimizes the parameter on a basis of whether the evaluation result of the image quality for each of the regions satisfies a first threshold set in advance for each of the regions according to a bit rate necessary when the image information is distributed and a second threshold for evaluating whether the image quality of the image information is equal to or higher than a predetermined level.

(9)
The information processing device according to (1), wherein the optimization processing unit
acquires the evaluation result of the image quality on the reception side of the image information, and optimizes the parameter in consideration of the acquired evaluation result of the image quality.

(10)
The information processing device according to (1), wherein
the image information is a game image for streaming distribution.

(11)
An information processing method comprising:
optimizing, on a basis of an evaluation result acquired by evaluation of image quality of when image information for streaming distribution is decoded into a reproducible state on a reception side, a parameter of when the image information is generated.

REFERENCE SIGNS LIST

1 INFORMATION PROCESSING SYSTEM
10 TERMINAL DEVICE
20 INFORMATION PROCESSING DEVICE
21 GENERATION UNIT
22 PREPROCESSING UNIT
23 ENCODING UNIT
24 DECODING UNIT
25 OPTIMIZATION PROCESSING UNIT
26 DATABASE
1000 COMPUTER
1001 PROCESSOR
1002 MEMORY
1003 COMMUNICATION MODULE

The invention claimed is:
1. An information processing device, comprising:
a generation unit configured to generate image information;
a preprocessing unit configured to process the generated image information, wherein the process is to improve visibility of the generated image information;
an encoding unit configured to encode the processed image information;
a decoding unit configured to decode the encoded image information; and
an optimization processing unit configured to:
evaluate an image quality for each region of a plurality of regions extracted from the decoded image information;
optimize, based on an evaluation result of the evaluation of the image quality, a first parameter for the generation of the image information, wherein
the evaluation result is based on the evaluation of the image quality of the decoded image information, the encoded image information, for streaming distribution, is decoded into a reproducible state on a reception side, and the first parameter is for the generation of the image information;

optimize, based on the evaluation result of the image quality, a second parameter, wherein the second parameter is for the process of the generated image information; and optimize, based on the evaluation result of the image quality, a third parameter, wherein the third parameter is for the encode of the processed image information.

2. The information processing device according to claim 1, wherein the optimization processing unit is further configured to optimize the first parameter based on whether the evaluation result of the image quality for the each region of the plurality of regions satisfies a specific threshold for the each region of the plurality of regions, and the specific threshold is in accordance with a bit rate necessary for the distribution of the image information.

3. The information processing device according to claim 2, wherein the optimization processing unit is further configured to optimize the first parameter by a prioritization on a region of the plurality of regions in which the evaluation result of the image quality is deviated most from the specific threshold, and the first parameter is optimized based on adjustment values of the first parameter compete between the plurality of regions.

4. The information processing device according to claim 1, wherein the optimization processing unit is further configured to optimize the first parameter based on whether the evaluation result of the image quality for the each region of the plurality of regions satisfies;

a first threshold, for the each region of the plurality of regions, is in accordance with a bit rate necessary for the distribution of the image information, and a second threshold for an evaluation of whether the image quality of the image information is equal to or higher than a specific level.

5. The information processing device according to claim 1, wherein the optimization processing unit is further configured to:

acquire the evaluation result of the image quality on the reception side of the image information; and optimize the first parameter based on the acquired evaluation result of the image quality.

6. The information processing device according to claim 1, wherein the image information is a game image for the streaming distribution.

7. An information processing method, comprising:

generating, by a generation unit, image information;

processing, by a preprocessing unit, the generated image information, wherein the processing is for improving visibility of the generated image information;

encoding, by an encoding unit, the processed image information;

decoding, by a decoding unit, the encoded image information;

evaluating, by an optimization processing unit, an image quality for each region of a plurality of regions extracted from the decoded image information;

optimizing, by the optimization processing unit based on an evaluation result of the evaluation of the image quality, a first parameter for the generation of the image information, wherein the evaluation result is based on the evaluation of the image quality of the decoded image information, the encoded image information, for streaming distribution, is decoded into a reproducible state on a reception side, and the first parameter is for the generation of the image information;

optimizing, by the optimization processing unit based on the evaluation result of the image quality, a second parameter, wherein the second parameter is for the processing of the generated image information; and optimizing, by the optimization processing unit based on the evaluation result of the image quality, a third parameter, wherein the third parameter is for the encoding of the processed image information.

* * * * *